(12) United States Patent
Bouk et al.

(10) Patent No.: US 7,873,231 B2
(45) Date of Patent: *Jan. 18, 2011

(54) DETERMINING SHARPNESS PREDICTORS FOR DIGITAL IMAGES

(75) Inventors: Theodore F. Bouk, Rochester, NY (US); Amy D. Enge, Spencerport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,406

(22) Filed: Apr. 21, 2010

(65) Prior Publication Data

US 2010/0202710 A1 Aug. 12, 2010

Related U.S. Application Data

(63) Continuation of application No. 10/938,770, filed on Sep. 10, 2004, now Pat. No. 7,764,844.

(51) Int. Cl.
*G06K 9/40* (2006.01)

(52) U.S. Cl. .................................... 382/254

(58) Field of Classification Search ............... 382/232, 382/248, 250, 254–275; 348/E5.024, E5.045, 348/E5.047, 222.1, 211.5, 211.99, 349, 33.04; 358/3.26, 3.27

See application file for complete search history.

(56) References Cited

U.S. PATENT DOCUMENTS

| 5,216,753 A | 6/1993 | Ng |
| 5,218,445 A | 6/1993 | van Roessel |
| 5,850,259 A | 12/1998 | Sugiyama |

(Continued)

OTHER PUBLICATIONS

Photography and graphic technology—Extended colour encodings for digital image storage, manipulation and interchange—Part 1 Architecture and requirements—ISO 22028-1:2004(E) pg. 6, 2004.

(Continued)

*Primary Examiner*—Samir A. Ahmed
*Assistant Examiner*—Atiba O. Fitzpatrick
(74) *Attorney, Agent, or Firm*—Kevin E. Spaulding

(57) ABSTRACT

A method for determining a sharpness predictor for an input digital image includes determining one or more image metrics by analyzing the input digital image; and determining the sharpness predictor from the one or more image metrics.

26 Claims, 2 Drawing Sheets

U.S. PATENT DOCUMENTS

| | | | |
|---|---|---|---|
| 5,892,847 A * | 4/1999 | Johnson | 382/232 |
| 5,959,674 A | 9/1999 | Jang et al. | |
| 5,974,181 A | 10/1999 | Prieto | |
| 6,807,312 B2 | 10/2004 | Thomas et al. | |
| 6,930,717 B1 | 8/2005 | Kobayashi et al. | |
| 6,937,284 B1 | 8/2005 | Singh et al. | |
| 6,937,743 B2 | 8/2005 | Rizzotti et al. | |
| 7,181,082 B2 | 2/2007 | Feng | |
| 7,184,582 B2 | 2/2007 | Giger et al. | |
| 7,257,273 B2 | 8/2007 | Li et al. | |
| 7,362,354 B2 | 4/2008 | Lin | |
| 2003/0095197 A1 | 5/2003 | Wheeler et al. | |
| 2003/0161520 A1 | 8/2003 | Yamano et al. | |
| 2004/0018011 A1 | 1/2004 | Tomita | |
| 2004/0024295 A1 | 2/2004 | Cook et al. | |

OTHER PUBLICATIONS

Smith et al, Understanding image quality losses due to smear in high-resolution remote sensing imaging systems, Opt. Eng. 38(5) 821-826 (May 1999).

Goodman, Introduction to Fourier Optics, pp. 122-125, McGraw Hill Book Co., 1968.

Kenneth R. Castleman, Digital Image Processing, Prentice Hall Inc., ISBN 0-13-211467-4, 1996, pp. 352-367.

* cited by examiner

DETERMINING SHARPNESS PREDICTORS FOR DIGITAL IMAGES

CROSS REFERENCE TO RELATED APPLICATIONS

This application is a continuation of U.S. patent application Ser. No. 10/938,770 filed Sep. 10, 2004, now U.S. Pat. No. 7,764,844 which is incorporated herein by reference in its entirety.

FIELD OF THE INVENTION

This method pertains to the field of digital imaging, and more particularly to the field of determining a sharpness predictor for an input digital image.

BACKGROUND OF THE INVENTION

When images are captured by a camera, there are a number of factors that can adversely affect the quality of the resulting image. One important factor is the sharpness of the image. There are several attributes of the imaging system that affect the sharpness of the image, such as the quality of the lens and the MTF of the image capture medium. But beyond these fundamental characteristics, there are other image-dependent factors that can seriously degrade the sharpness, and therefore the image quality, of the image. These factors include overall lens defocus (e.g., due to attempting to capture an image of an object that is too close to the camera), defocus of the main subject (e.g., due to the camera auto-focusing on the wrong object in the scene), insufficient depth-of-field to capture the range of important object distances, fogging of the lens element due to condensation of water vapor, and smearing due to motion of the camera and/or objects in the scene.

In conventional photography using photographic film, it is usually not possible to determine whether the captured image has acceptable sharpness until the film is processed and printed. With the advent of digital cameras, it is possible to preview the image at the time of capture. In theory, this allows the photographer to assess the quality of the image, and, if necessary, capture another image to correct image quality problems. However, the quality of the preview displays used on most digital cameras is insufficient to adequately evaluate the image quality in many cases. As a result, the photographer may not realize that the quality of an image is poor until after the image has been printed or previewed at a later time on a high-resolution display. As a result, the photographer may miss any opportunity to capture an improved image, or may be dissatisfied that time/money was wasted in making a print of a poor quality image. Therefore, there is a need for a means to automatically assess the sharpness of a digital image at the time that the image is captured.

There are examples of prior art in this field. Some cameras offer a warning signal if camera shake is likely to occur due to an excessively long exposure time. Tomita discloses (U.S. Patent Application Publication 2004/0018011 A1) a vibration correcting optical device comprised of a vibration detection unit that detects a vibration of the vibration correcting optical device and outputs a vibration detection signal corresponding to the vibration. Wheeler, et al. disclose (U.S. Patent Application Publication 2003/0095197 A1) a method of using image metadata to predict camera shake. A significant problem with these arrangements is that they do not directly measure the level of blur in the captured image itself; but rather attempt to predict whether the image might be blurred based on other pieces of information. As a result, these methods are only effective at identifying certain sources of image blur (e.g., blur due to camera shake).

SUMMARY OF THE INVENTION

It is an object of the present invention to provide a sharpness predictor that can be used to detect digital images having poor sharpness.

This object is achieved by a method for determining a sharpness predictor for an input digital image comprising:
  a) determining one or more image metrics by analyzing the input digital image; and
  b) determining the sharpness predictor from the one or more image metrics.

It is a feature of this invention that this sharpness predictor can be used in applications such as alerting a user that a digital image may have poor sharpness in order to provide an opportunity to capture an improved digital image, or that the digital image may not be appropriate for producing high-quality prints.

DETAILED DESCRIPTION OF THE INVENTION

Figure 1:
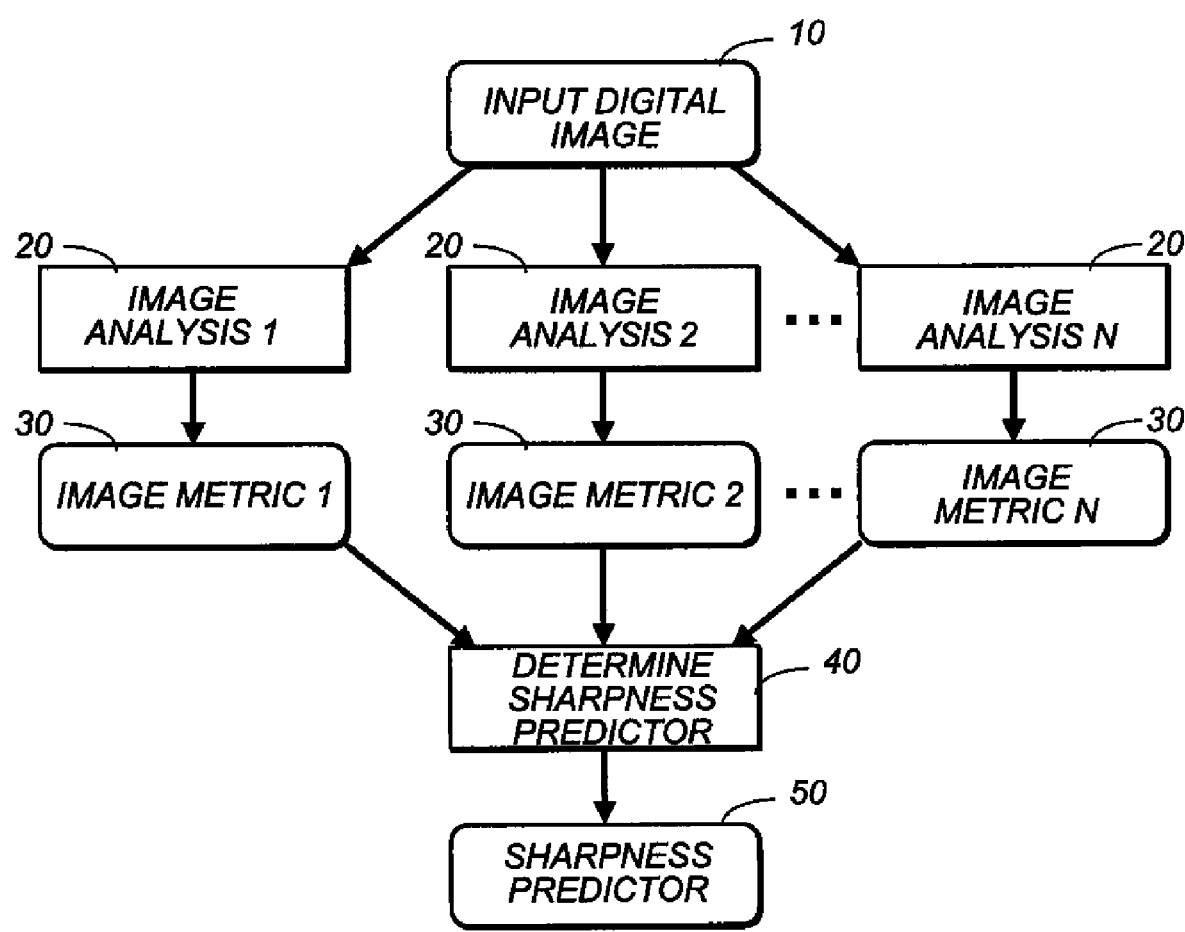
FIG. 1 is a flowchart showing the method of the present invention.

Turning to FIG. 1, the present invention will be described with reference to a preferred embodiment. A method is described for determining a sharpness predictor for an input digital image 10. First, the input digital image 10 is analyzed using one or more image analysis steps 20 to determine one or more corresponding image metrics 30, wherein at least one of the image metrics 30 is related to the spatial frequency content of the input digital image 10. Next, a determine sharpness predictor step 40 is used to determine a sharpness predictor 50 from the one or more image metrics 30, wherein the sharpness predictor 50 represents an estimate of the sharpness of the input digital image 10. Each of these steps will now be discussed in more detail.

In a preferred embodiment of the present invention, the input digital image 10 is an image captured using a digital camera. The invention can be applied to a digital image at any point in the imaging chain of the digital camera. For example, the input digital image 10 can be a raw digital image corresponding to the initial digital image captured by the sensor in the digital camera. Alternatively, a processed digital camera image can be used for the input digital image 10, where the processed digital camera image is formed by applying various processing steps to the raw digital image. The processed digital camera image can correspond to the output digital image formed by the digital camera (e.g., an image prepared for display on a conventional CRT in a color space such as the well-known sRGB), or it can correspond to an intermediate processing state. It will be obvious to one skilled in the art that other forms of input digital images 10 could also be used in accordance with the present invention, including digital images formed by scanning photographic prints or negatives.

The present invention can be applied to color input digital images or black-and-white input digital images. For the case of a color input digital image, the present invention is preferably applied to a luminance signal extracted from the color input digital image since most of the sharpness information in an image is contained in the luminance portion of the image (although it can also be applied to the full-color input digital image). A luminance signal is typically determined from the color input digital image by computing a weighted sum of the individual color channels $$Y = K_r R + K_g G + K_b B \qquad (1)$$

where R, G and B are the red, green and blue color channel values for a particular pixel of the color input digital image, and $K_r$, $K_g$ and $K_b$ are weighting coefficients. There are many different sets of weighting coefficients that are commonly used in the art for determining a luminance signal depending on the input color space and the particular application. In a preferred embodiment of the present invention, the input color space is a video RGB color space (such as the well-known sRGB), and a corresponding set of weighting coefficients are $K_r=0.299$, $K_g=0.587$ and $K_b=0.114$ There are many different forms of image analysis steps 20 that can be used in accordance with the present invention to determine the one or more image metrics 30. Since the sharpness of the image is fundamentally related to the spatial frequency content of the input digital image 10, it will generally be desirable for the image metrics 30 to infer image sharpness by analyzing the input digital image 10 to estimate the spatial frequency content of the input digital image 10. There are many different ways to estimate the spatial frequency content of the input digital image 10. In a preferred embodiment of the present invention, a discrete cosine transform (DCT) is performed on blocks of the input digital image 10 to compute blocks of discrete cosine transform coefficients. These blocks of discrete cosine transform coefficients provide estimates of the spatial frequency content contained in the corresponding block of the input digital image 10. This is convenient in many cases since many digital cameras already use DCTs in their imaging chains as part of an image compression operation. Therefore, the cameras will frequently have software, or dedicated hardware, available to perform these calculations. Alternatively, other spatial frequency estimators, such as Fast Fourier Transforms (FFTs), gradient estimator operators, or wavelet transforms, could be used to estimate the spatial frequency content of the input digital image 10. In general, it may be advantageous from a computational efficiency standpoint to utilize spatial frequency estimators that are calculated for other reasons, such as image compression operations, in the process of computing the image metrics 30.

The two-dimensional DCT of an n×n block of input digital image pixels, $f_i(j,k)$, is given by:

$$F_i(u, v) = \frac{4C(u)C(v)}{n^2} \sum_{j=0}^{n-1} \sum_{k=0}^{n-1} f_i(j, k) \cos\left[\frac{(2j+1)u\pi}{2n}\right] \cos\left[\frac{(2k+1)v\pi}{2n}\right] \qquad (2)$$

where i is the block number, j and k are the horizontal and vertical coordinates of a pixel in the block of input digital image pixels, respectively, u and v are the horizontal and vertical spatial frequency indices, respectively, $$C(w) = \begin{cases} 1/\sqrt{2}; & \text{for } w = 0 \\ 1; & \text{for } w = 1, 2, \ldots, n-1 \end{cases} \qquad (3)$$

and $F_i(u,v)$ is the resulting block of discrete cosine transform coefficients. The values of $F_i(u, v)$ represent the amplitudes of the spatial frequency content for the $i^{th}$ image block at the frequencies (u, v).

Once the DCT coefficients have been computed for each block of the input digital image 10, a variety of image analysis steps 20 can be used to determine corresponding image metrics 30. Many of these image metrics 30 can be determined by computing various image statistics from the blocks of DCT coefficients. Examples of several such image statistics will now be described. However, it will be obvious to one skilled in the art that many different forms of image analysis steps 20 could be used in accordance with the present invention.

The sharpness of the input digital image will be reflected in the amount of high spatial frequency information in the DCT coefficients. One image statistic, which is a measure of how much high spatial frequency information is present, is to calculate the radial frequency of the centroid of the DCT coefficients for each block of input digital image pixels. This will provide a measure of how much high spatial frequency content there is in each image block. The values from each image block can then be combined to form a single overall DCT centroid image metric, $M_1$:

$$M_1 = \frac{1}{N} \sum_{i=1}^{N} \left[ \frac{\sum_{u=1}^{n} \sum_{v=1}^{n} |F_i(u, v)|(u^2+v^2)^{1/2}}{\sum_{u=1}^{n} \sum_{v=1}^{n} |F_i(u, v)|} \right] \qquad (4)$$

where N is the number of image blocks. Generally, it is desirable to exclude the DC coefficient (i.e., u=v=1) from this calculation so that the image metric is independent of the overall brightness of the image block. This can be done by setting $F_i(1,1)=0$ before computing the image metric.

The image metric shown in Eq. (4) is sometimes prone to misidentify image blocks as being unsharp, when in reality they simply correspond to flat areas of the image such as skies. An improvement to this metric can be made by only including image blocks in the calculation that contain significant spatial frequency content. Another image statistic, which is an indicator of whether an image block contains significant spatial frequency content, is the maximum amplitude of the DCT coefficients. This quantity can be determined and compared to some threshold T to identify the image blocks that should be included in the computations:

$$\text{Max}(|F_i(u,v)|) > T \qquad (5)$$

Any image block whose DCT coefficients are all smaller than the threshold value, T, will not be included in the computation of image statistics. While the image metric in Eq. (4) of the Centroid can identify DCT blocks having higher amounts of high frequency information, this is a relative metric. If two blocks have the same value for Eq. (4) but different overall DCT coefficient response levels, the DCT block having the greater overall DCT coefficient response level is more significant. Therefore an image statistic that sums the total DCT response in the block, after zeroing the DC contribution, is desirable. The values from each image block can then be combined to form an integrated DCT response image metric, $M_2$:

$$M_2 = \frac{1}{N} \sum_{i=1}^{N} \left( \sum_{u=1}^{n} \sum_{v=1}^{n} |F_i(u, v)| \right) \qquad (6)$$

where N is the number of image blocks in the image.

The image metrics described in Eqs. (4) through (6) can be extended to subregions of the DCT block as follows. The DCT block can be envisioned as including subregions corresponding to all low frequency content, all high frequency content and sub-regions of mixed high and low frequency content in either the horizontal or vertical directions. One possible method of partitioning the DCT block into such subregions would be to divide the DCT block into four equal quadrants. It will be obvious to anyone skilled in the art, that other partitionings would be possible and all such partitionings share a common interpretation.

Figure 2:
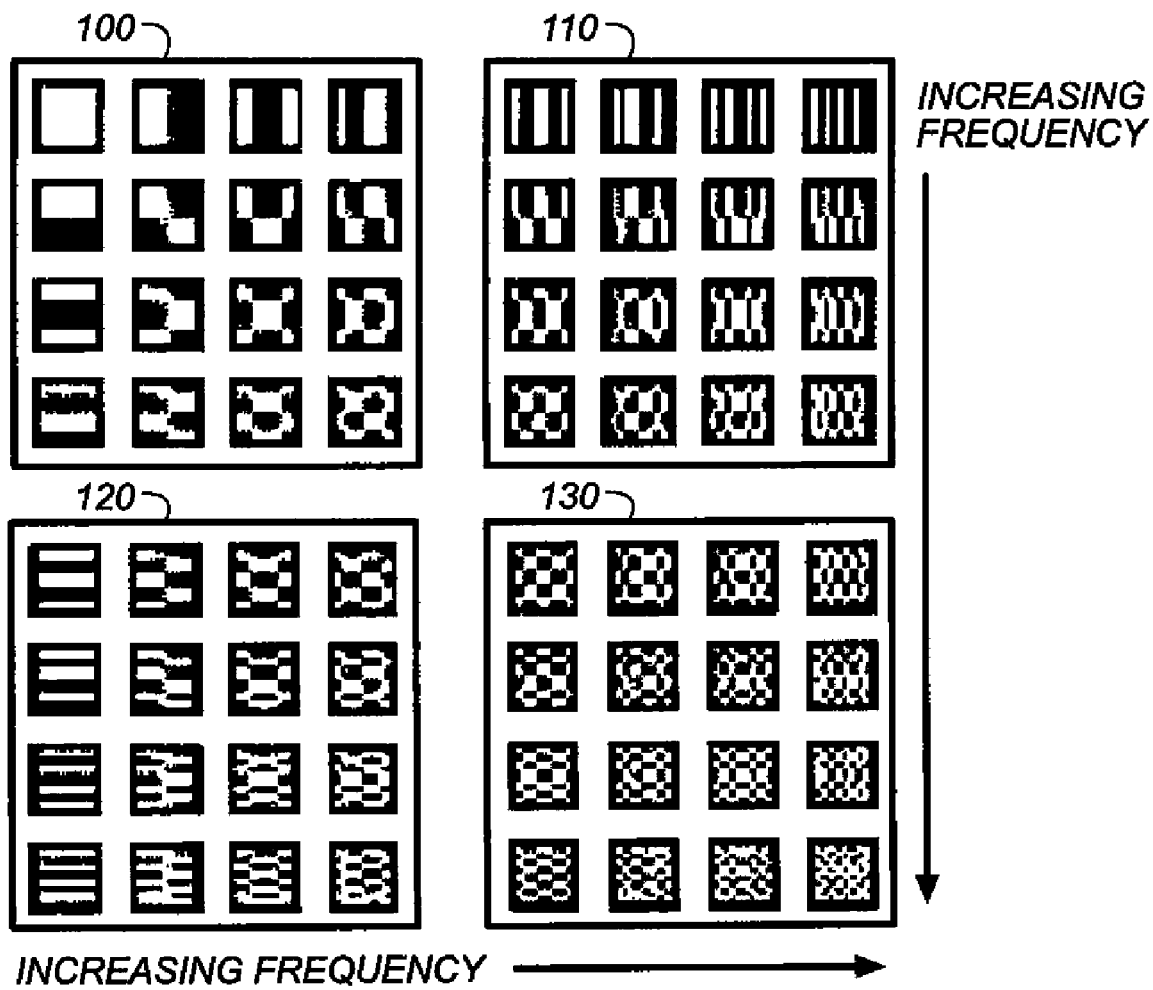
FIG. 2 shows four different discrete consine transforms.

FIG. 2, shows a DCT block quadrant partitioning, including subregions corresponding to all low frequency content 100, all high frequency content 130, and a mixture of high horizontal frequency content and low vertical frequency content, 110, or high vertical frequency content and low horizontal frequency content, 120. Under such a partitioning scheme the radial frequency can be computed for each quadrant of the DCT block. This will provide a measure of how much high spatial frequency content there is in each quadrant of the image block. The values from each quadrant of the image block are then be combined to form a single overall image metric appropriate for that quadrant, $M_{1j}$:

$$M_{1j} = \frac{1}{N} \sum_{i=1}^{N} \left[ \frac{\sum_{u_j=1}^{n_j} \sum_{v_j=1}^{n_j} |F_{ij}(u,v)|(u_j^2+v_j^2)^{1/2}}{\sum_{u_j=1}^{n_j} \sum_{v_j=1}^{n_j} |F_{ij}(u_j,v_j)|} \right] \quad (7)$$

where j=1, 2, 3, or 4, N is the number of image blocks in the image and $n_j$ is the number of DCT coefficients along either the horizontal or vertical dimension of the $j^{th}$ DCT block quadrant. This would provide increased resolution in determining the difference in high spatial frequency distribution within the DCT block, and would then replace the single overall DCT centroid image metric $M_1$ with four quadrant DCT centroid image metrics $M_{11}$, $M_{12}$, $M_{13}$, and $M_{14}$. In similar fashion, the values of each quadrant of the image block can also be combined to form an integrated DCT coefficient response metric appropriate for that quadrant, $M_{2j}$:

$$M_{2j} = \frac{1}{N} \sum_{i=1}^{N} \left( \sum_{u_j=1}^{n_j} \sum_{v_j=1}^{n_j} |F_i(u_j,v_j)| \right) \quad (8)$$

where j=1, 2, 3, or 4, N is the number of image blocks in the image and $n_j$ is the number of DCT coefficients along either the horizontal or vertical dimension of the $j^{th}$ DCT block quadrant. This would provide increased resolution in determining how the total integrated DCT coefficient response is distributed within each DCT block, and would then replace the single integrated DCT coefficient response metric $M_2$ with four quadrant integrated DCT coefficient response image metrics $M_{21}$, $M_{22}$, $M_{23}$, and $M_{24}$.

The example image metrics that have been described above are illustrative of image metrics 30. However, it will be obvious to one skilled in the art that many other forms of image metrics could also be determined that could be used in accordance with the present invention. Examples of other types of image metrics 30 that could be used would include the number of image pixels darker than a specified threshold, the number of image pixels lighter than a specified threshold, edge gradients, contrast changes, or pixel kurtosis.

Once all of the image metrics 30 have been computed, the determine sharpness predictor step 40 is used to determine the sharpness predictor 50. In a preferred embodiment of the present invention, the image metrics 30 can be combined by computing a weighted summation:

$$P = \sum_{l=1}^{L} a_l M_l \quad (9)$$

where L is the number of image metrics, $a_l$ is a weighting coefficient used to weight an $l^{th}$ image metric $M_l$. It should be noted each of the image metrics $M_l$ could be individual image metrics such as those described above, or could be some linear or nonlinear combination of such image metrics. For example, $M_c$ can be determined by multiplying $M_a$ and $M_{b3}$. This also provides a means to include interaction terms. Similarly, higher-order terms can be included by including image metrics that are powers of previously defined image metrics (e.g., $M_d=(M_{a2})^2$). Similarly, new image metrics can be computed that are functions of the various image metrics. For example, a new image metric could be computed that is the logarithm of another image metric. A weighted sum of such functions of the one or more image metrics could then be included in the weighted summation in Eq. (9).

The weighting coefficients, $a_l$, from Eq. (9) can be determined in various ways. Many of these methods rely on the existence of a set of test images for which an independent assessment of unsharpness already exists. This assessment should be continuous in nature and be relatively uniform across the image space. If a change in unsharpness were to occur in any image assessed at low levels of image unsharpness, the visual impact of this change in unsharpness should be approximately the same as it would be if it were to occur in an image assessed at high levels of unsharpness. One possible scale that possesses this property is the well-known Just Noticeable Difference (JND) scale. Once a set of test images have been assembled and subjectively evaluated in some manner to assign to each image a JND value reflecting the subjective evaluation of unsharpness of this image, the same set of images can then be analyzed in accordance with the methods described above to determine corresponding image metrics 30, and any appropriate combinations/transformations of these image metrics. Statistical methods, such as linear regression, can then be used to correlate values of the two or more image metrics, 30, and the subjectively determined image sharpness values, thereby determining the least squares best estimates of the weighting coefficients, $a_l$. The linear regression results in weighting coefficients, $a_l$, which, in conjunction with the image metrics, $M_l$, constitute a determine sharpness predictor step 40. In a preferred embodiment of the present inventions, application of the weighting coefficients, $a_l$, to the image metrics, $M_l$, in the manner described in Eq. (9), generates sharpness predictor 50 for an image with units of JNDs of unsharpness.

Additionally, this continuous scale of JND values could then be segmented to generate categories of unsharpness appropriate for determining whether the quality of the input digital image 10 is sufficient for multiple applications. A possible application might be the rendering of the input digital image 10 as a reflection print. Determination of the unsharpness category associated with the input digital image 10 could result in a warning message, or a recommended image usage message, being sent to the user via a user interface, or other appropriate action taken. This information could also be stored in the file header information associated with the input digital image 10, in the digital camera, to be used as a control parameter to facilitate taking corrective actions at the time of printing the input digital image 10 to achieve optimal image quality.

It will be obvious to one skilled in the art that other methods can be used to combine the image metrics 30 to determine the sharpness predictor 50. For example, one alternative approach would be to use a so-called "neural network" model. Such models are well known in the art. Such methods could also include the use of sharpness metrics determined from image capture parameters associated with the digital camera. Such image capture parameters could include an exposure time parameter, a lens aperture parameter, a flash-fired parameter, or combinations thereof. These image capture parameters would then be used as additional image metrics 30 in the manner described above to determine the sharpness predictor 50.

The steps described above could also be applied to any subset of pixels extracted from the input digital image 10 and the image metrics could then be determined from this subset of the input digital image. For example, a subset of the input digital image extracted from the center of the input digital image could be used to select the image region likely to be of greater importance to the user and the image metrics could then be determined from this subset of the input digital image. Alternatively, input digital image pixel subsets could be selected by various preprocessing criterion aimed at identifying regions of enhanced interest. For example, a subset of the input digital image can be interactively specified by a user, or the main subject of the image could be identified using an automatic main subject detection algorithm. This input digital image pixel subset would then become the new input digital image 10, and the analysis procedure would proceed as described above.

A computer program product can be used in the practice of this invention and includes one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 10 | input digital image |
| 20 | analysis steps |
| 30 | image metrics |
| 40 | determine sharpness predictor step |
| 50 | sharpness predictor |
| 100 | low frequency content |
| 110 | mixture of high horizontal and low vertical frequency content |
| 120 | mixture of low horizontal and high vertical frequency content |
| 130 | high frequency content |

The invention claimed is:

1. A method for determining-sharpness predictors for input digital images that are not test pattern images, captured by a digital camera, comprising:
   a) capturing a single input digital image by photographing a natural scene using the digital camera;
   b) dividing the single input digital image into image blocks;
   c) using a processor to compute blocks of discrete cosine transform coefficients by applying discrete cosine transforms to the image blocks;
   d) using a processor to compute one or more image metrics by analyzing only the single input digital image captured by the digital camera, wherein at least one of the image metrics is an image sharpness metric related to the spatial frequency content of the single input digital image which is determined by combining the discrete cosine transform coefficients computed for a plurality of image blocks; and
   e) using a processor to compute a single sharpness predictor for the single input digital image from the one or more image metrics, wherein the sharpness predictor represents an indication of the level of sharpness degradations introduced by the digital camera.

2. The method of claim 1 further including the step of storing the input digital image in a digital image file.

3. The method of claim 2 wherein metadata providing an indication of the image sharpness is stored in association with the digital image file responsive to the computed sharpness predictor.

4. The method of claim 1 wherein the input digital image is a color input digital image and one or more of the image metrics are computed from a luminance signal computed from the color input digital image.

5. The method of claim 1 wherein the computation of the block metrics includes the step of computing image statistics for the blocks of discrete cosine transform coefficients.

6. The method of claim 1 wherein the computation of the image statistics includes computing a centroid for the blocks of discrete cosine transform coefficients.

7. The method of claim 6 wherein the computation of the image statistics includes computing sums for the blocks of discrete cosine transform coefficients.

8. The method of claim 6 wherein blocks of discrete cosine transform coefficients failing to meet a threshold criterion are excluded from the computation of the image metric.

9. The method of claim 1 wherein the step of applying discrete cosine transforms to blocks of the input digital image is applied as part of an image compression operation.

10. The method of claim 1 wherein the image sharpness metric is computed from compressed digital image data determined using an image compression operation.

11. The method of claim 10 further including the step of storing the compressed digital image data in a digital image file, together with metadata providing an indication of the image sharpness in response to the computed sharpness predictor.

12. The method of claim 1 wherein the computation of one or more of the image metrics includes the step of computing the number of image pixels darker than a specified threshold.

13. The method of claim 1 wherein the computation of one or more of the image metrics includes the step of computing the number of image pixels lighter than a specified threshold.

14. The method of claim 1 wherein the image metrics are computed from a subset of the input digital image.

15. The method of claim 14 wherein the subset of the input digital image is extracted from the center of the input digital image.

16. The method of claim 14 wherein the subset of the input digital image corresponds to a main subject region of the input digital image.

17. The method of claim 16 wherein an automatic main subject detection algorithm is used to identify the main subject region of the input digital image.

18. The method of claim 14 wherein the subset of the input digital image is interactively specified by a user.

19. The method of claim 1 wherein the sharpness predictor is computed by computing a weighted summation of the two or more image metrics.

20. The method of claim 1 wherein the sharpness predictor is computed by computing a weighted sum of functions of the one or more image metrics.

21. The method of claim 1 further including using the sharpness predictor to estimate whether the quality of the input digital image is sufficient for a particular usage.

22. The method of claim 21 wherein the usage is producing a reflection print.

23. The method of claim 1 further including using the sharpness predictor as a control parameter for a subsequent image processing operation.

24. The method of claim 1 wherein the step of computing the sharpness predictor further includes using one or more additional sharpness metrics computed from image capture parameters.

25. The method of claim 24 wherein the image capture parameters include an exposure time parameter, a lens aperture parameter, a flash-fired parameter, or combinations thereof.

26. A computer program product, comprising a non-transitory tangible computer readable storage medium for practicing the method according to claim 1.

* * * * *